US012616914B2

(12) United States Patent
Faga et al.

(10) Patent No.: US 12,616,914 B2
(45) Date of Patent: May 5, 2026

(54) CONVERTIBLE COUNTERWEIGHT RIGGING SYSTEM

(71) Applicant: Electronic Theatre Controls, Inc., Middleton, WI (US)

(72) Inventors: Ryan Faga, Cross Plains, WI (US); Kenric Gibbs, Dane, WI (US); Steven Ricks, Lodi, WI (US)

(73) Assignee: Electronic Theatre Controls, Inc., Middleton, WI (US)

( * ) Notice: Subject to any disclaimer, the term of this patent is extended or adjusted under 35 U.S.C. 154(b) by 574 days.

(21) Appl. No.: 18/324,348

(22) Filed: May 26, 2023

(65) Prior Publication Data

US 2023/0398463 A1 Dec. 14, 2023

Related U.S. Application Data

(60) Provisional application No. 63/351,110, filed on Jun. 10, 2022.

(51) Int. Cl.
*A63J 1/02* (2006.01)
*B66D 1/60* (2006.01)

(52) U.S. Cl.
CPC ................ *A63J 1/02* (2013.01); *A63J 1/028* (2013.01); *B66D 1/60* (2013.01)

(58) Field of Classification Search
CPC ................ A63J 1/02; A63J 1/028; B66D 1/60
USPC ............. 254/338, 264, 265, 266; 472/77, 78
See application file for complete search history.

(56) References Cited

U.S. PATENT DOCUMENTS 5,361,565 A * 11/1994 Bayer ..................... B66C 13/26 254/273
5,531,297 A * 7/1996 Pipan ...................... B66D 5/16 188/65.1
5,711,713 A * 1/1998 Krueger ................. A63J 1/028 472/78
5,996,970 A * 12/1999 Auerbach ................ B66D 1/60 472/78

(Continued)

FOREIGN PATENT DOCUMENTS

CN 104627911 B * 1/2017 ............... B66D 1/60

OTHER PUBLICATIONS

Young, "Rigging 101: Knowing and operating your counterweight rigging system," Sight & Sound, Church & Worship Technology, Sep. 2009, (pp. 14, 16, 18, 20, 22).

*Primary Examiner* — Eugene L Kim
*Assistant Examiner* — Saba N. Ali
(74) *Attorney, Agent, or Firm* — Michael Best & Friedrich LLP

(57) ABSTRACT

A counterweighted theatrical rigging system for movably supporting theatrical equipment above a stage floor. The rigging system includes a batten on which the theatrical equipment is configured to be supported. A counterweight arbor of the rigging system is configured to balance and offset the weight of the loaded batten. The counterweighted theatrical rigging system is convertible between a first configuration in which the batten and the counterweight arbor are linked for corresponding movement in opposite vertical directions, and a second configuration that allows the batten to be lowered to the stage floor while the counterweight arbor remains in a lowered position for ballasting the counterweight arbor from the stage floor.

21 Claims, 7 Drawing Sheets

(56) References Cited

U.S. PATENT DOCUMENTS

| | | | | |
|---|---|---|---|---|
| 6,520,485 | B1 * | 2/2003 | Soot | B66D 1/39 160/331 |
| 6,634,622 | B1 * | 10/2003 | Hoffend, Jr. | A63J 1/028 254/331 |
| 7,562,863 | B2 * | 7/2009 | Kochan | B66D 5/14 254/331 |
| 7,775,506 | B2 * | 8/2010 | Hoffend, III | A63J 1/028 160/331 |
| 8,317,159 | B2 * | 11/2012 | Hoffend, III | F16M 13/022 160/331 |
| 8,596,616 | B1 * | 12/2013 | Soot | A63J 1/028 254/394 |
| 9,474,988 | B2 * | 10/2016 | Shatzkin | A63J 1/028 |
| 9,782,690 | B2 * | 10/2017 | Boychuk | B66D 1/60 |
| 12,006,192 | B1 * | 6/2024 | Brants | B66D 3/20 |
| 2002/0083970 | A1 * | 7/2002 | Langhart | E04H 15/18 426/333 |
| 2004/0099852 | A1 * | 5/2004 | Hoffend, Jr. | B66D 1/00 254/331 |
| 2006/0163548 | A1 * | 7/2006 | Kochan | B66D 5/14 254/278 |
| 2007/0063175 | A1 * | 3/2007 | Kaiser | B66D 1/7405 254/358 |
| 2007/0227830 | A1 * | 10/2007 | Svitavsky | A63J 1/028 187/366 |
| 2010/0258699 | A1 * | 10/2010 | Boychuk | B66B 17/12 16/400 |
| 2011/0042634 | A1 * | 2/2011 | Boychuk | B66D 1/12 254/362 |
| 2011/0164928 | A1 * | 7/2011 | Homsi | E02D 7/16 405/232 |
| 2013/0153841 | A1 * | 6/2013 | Schumacher | B66C 23/44 254/338 |
| 2015/0083879 | A1 * | 3/2015 | Hoffend, III | B66D 1/60 254/338 |

* cited by examiner

CONVERTIBLE COUNTERWEIGHT RIGGING SYSTEM

CROSS-REFERENCE TO RELATED APPLICATIONS

The present application claims priority to U.S. Provisional Patent Application No. 63/351,110, filed on Jun. 10, 2022, the entire contents of which are incorporated by reference herein.

BACKGROUND

The present application relates to theater/staging equipment. Performance venues such as theaters, arenas, concert halls, auditoriums, schools, clubs, convention centers, and television studios can employ battens or trusses to suspend, elevate, and/or lower lighting, scenery, draperies, and other equipment that can be moved relative to a stage floor. Conventional counterweighted riggings systems are known to provide a rope and pulley system by which the weight of a loaded batten is offset or balanced by a counterweight arbor so that raising/lowering the loaded batten is easily accomplished—often by hand with a hand line. As such, for setup, counterweights are added to the counterweight arbor after loading the batten with the requisite equipment. Due to the nature of the connection between the batten and the counterweight arbor, the batten is up when the counterweight arbor is down, and the batten is down when the counterweight arbor is up. The batten is typically loaded up with the requisite equipment at the stage floor level. A worker then loads the counterweight arbor with counterweights from an elevated gallery where various counterweights are stored.

Alternatives to traditional counterweighted rigging systems include motorized lift systems with automated controls. Such motorized lift systems can obviate manual tasks such as balancing the loaded batten with counterweights and operating a hand line to raise/lower the batten. However, motorized lift systems represent a complete departure from traditional counterweighted rigging systems at a level of cost and complexity that is not suitable for every venue.

SUMMARY

In one aspect, the invention provides a counterweighted theatrical rigging system for movably supporting theatrical equipment above a stage floor. The rigging system includes a batten on which the theatrical equipment is configured to be supported. A counterweight arbor of the rigging system is configured to balance and offset the weight of the loaded batten. The counterweighted theatrical rigging system is convertible between a first configuration in which the batten and the counterweight arbor are linked for corresponding movement in opposite vertical directions, and a second configuration that allows the batten to be lowered to the stage floor while the counterweight arbor remains in a lowered position for ballasting the counterweight arbor from the stage floor.

In another aspect, the invention provides a counterweighted theatrical rigging system including a head block and a plurality of loft blocks provided at an elevated height above a stage floor. A plurality of lift lines extend over the head block and the plurality of loft blocks. A batten of the rigging system is configured to be loaded with theatrical equipment, the batten coupled with first ends of the plurality of lift lines. A counterweight arbor is configured to balance and offset the weight of the loaded batten, and the counterweight arbor is coupled with second ends of the plurality of lift lines. A lift line lock is configured to selectively lock the second ends of the plurality of lift lines to the counterweight arbor. A winch is configured to selectively reel in or let out the second ends of the plurality of lift lines from the counterweight arbor when the lift line lock is not locked.

In yet another aspect, the invention provides a method of operating a counterweighted theatrical rigging system. The method includes loading theatrical equipment to a batten from the stage floor with the batten in a lowered position. From the stage floor and with the batten in the lowered position, ballasting the counterweight arbor is carried out while the counterweight arbor is coupled to the batten. After loading the batten and ballasting the counterweight arbor, the rigging system is converted from a loading configuration in which the batten can move vertically without movement of the counterweight arbor into an operating configuration in which the batten and the counterweight arbor are linked for corresponding movement in opposite vertical directions.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
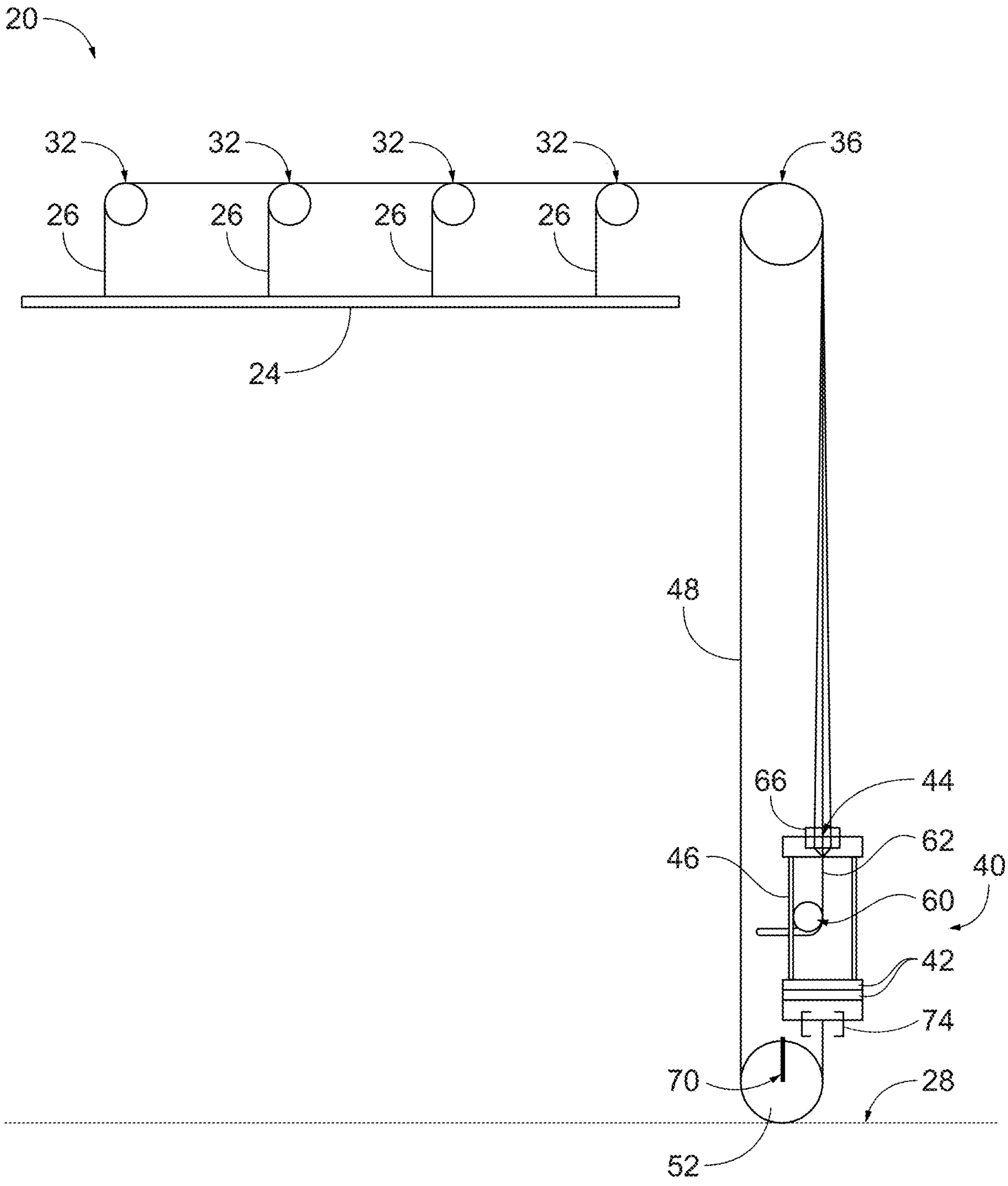
FIG. 1 illustrates a counterweighted theatrical rigging system in a normal operating configuration. A batten for theatrical equipment is positioned at its uppermost position, and a counterweight arbor connected to the batten is positioned at its lowermost position.

A counterweighted theatrical rigging system 20 is shown in FIG. 1. The rigging system 20 includes a batten 24 configured to support any number of pieces of theatrical equipment such as but not limited to lighting, speakers, and/or scenery drapes. The batten 24 can be constructed as a hollow pipe, although not limited to such construction. The batten 24 is configured to maintain a horizontal orientation during vertical movements with respect to a stage floor 28. The batten 24 is supported by a group of lift lines ("fly set") 26 that extend from the batten 24, over respective loft blocks 32, over a head block 36, and down to a counterweight arbor 40. Each of the lift lines 26 has a first end coupled with the batten 24 and a second end coupled with the counterweight arbor 40. In the normal operating configuration shown in FIG. 1, the first ends of the lift lines 26 are fixedly secured with the batten 24 to move therewith, and the second ends of the lift lines 26 are fixedly secured with the counterweight arbor 40 to move therewith. At the second ends, the lift lines 26 can be combined at a clew 44, and the clew 44 is fixedly secured to the counterweight arbor 40, for example at or near a top end of the counterweight arbor 40. Thus, the second ends of the lift lines 26 can be considered to be indirectly coupled to the counterweight arbor 40 and movable therewith.

A hand line or operating line 48 (e.g., a rope) has a first end secured to the bottom end of the counterweight arbor 40. From the bottom of the counterweight arbor 40, the operating line 48 extends around a tensioned lower sheave 52 as shown in the detail view of FIG. 4, up to and around the head block 36, and back down to the top end of the counterweight arbor 40 to which its second end is secured as shown in the detail view of FIG. 3. When the counterweight arbor 40 is loaded with sufficient ballast weights 42 to offset or counterbalance the loaded batten 24, the loaded batten 24 is easily moved up and down by manual operation of the operating line 48 by a technician. When the operating line 48 is pulled down, the counterweight arbor 40 moves vertically upward and the batten 24 moves a corresponding amount downward toward the stage floor 28. When the operating line 48 is pulled upward, the counterweight arbor 40 moves vertically downward and the batten 24 moves a corresponding amount upward away from the stage floor 28. The operating line 48 can be locked into any fixed position by the use of a rope lock (on a stationary fixture such as a locking rail, not shown) to prevent unintended movements of the batten 24.

As can be appreciated from the above description, the normal operating configuration of FIG. 1 has the batten 24 and the counterweight arbor 40 linked together for opposite vertical movements. At least in the illustrated construction, the vertical range of movement for each of the batten 24 and the counterweight arbor 40 is the same and is roughly equal to the vertical distance between the stage floor 28 and both the loft blocks 32 and the head block 36 (e.g., the distance between the stage floor 28 and the loft blocks 32 and the head block 36, minus the height of the counterweight arbor 40). The normal operating configuration dictates that the batten 24 being lowered to the stage floor 28 requires the counterweight arbor 40 to be raised up at or near its maximum elevation. Such a configuration, to which prior art systems are limited, have typically required the loading of ballast weights 42 (to counterbalance the loaded batten 24) onto the counterweight arbor 40 at an elevated height at or near the maximum operating elevation for the counterweight arbor 40. The venue will typically have a catwalk or gallery at this elevated position where the ballast weights 42 are stored for loading/unloading by the technician during a setup procedure following loading of the batten 24.

However, the rigging system 20 of the present disclosure is not limited to the normal operating configuration and is convertible to an alternate or setup configuration in which the batten 24 and the counterweight arbor 40 are unlinked to enable independence of their vertical positions and movements. Unlinking the batten 24 and the counterweight arbor 40 does not correspond to a complete detachment or disassembly, as an adjustable connection remains therebetween for bringing the rigging system 20 back to the normal operating configuration of FIG. 1. As described below, the alternate or setup configuration allows for a specific loading configuration (FIG. 2) in which both the batten 24 and the counterweight arbor 40 are positioned at the stage floor 28 for loading (with theatrical equipment and ballast weights 42, respectively).

Figure 2:
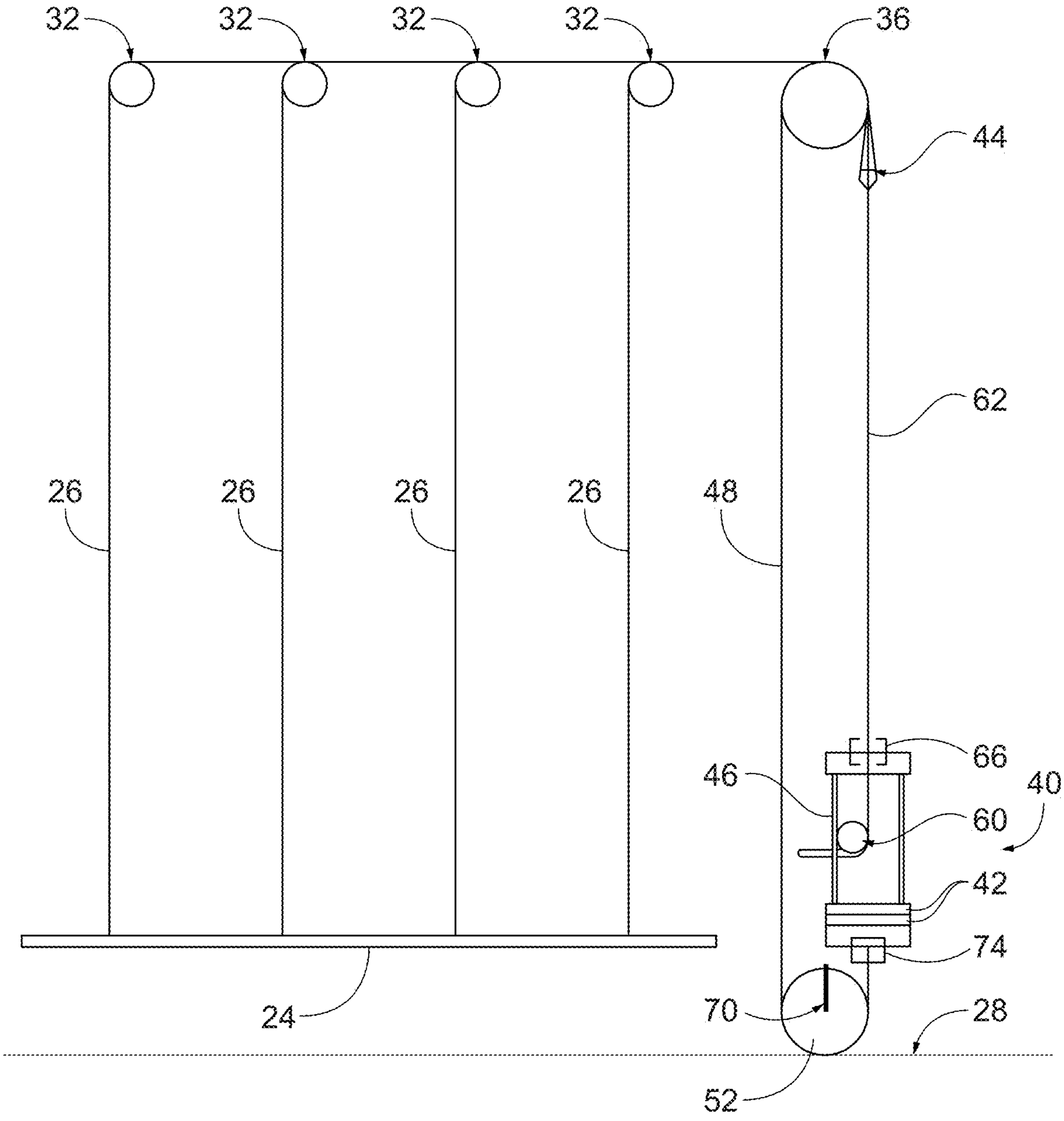
FIG. 2 illustrates the counterweighted theatrical rigging system in a loading configuration where the batten and the counterweight arbor are at their respective lowermost positions so that both may be loaded from the stage floor.

To facilitate moving the rigging system 20 to the loading configuration of FIG. 2, the counterweight arbor 40 supports a winch 60 that is operable to selectively wind and unwind a winch line 62 that provides the adjustable connection between the batten 24 and the counterweight arbor 40. In particular, the winch line 62 can have one end securely fixed to the clew 44 and a second end secured to a drum of the winch 60. Thus, the winch line 62 acts like a length extension for the lift lines 26 when the batten 24 and the counterweight arbor 40 are unlinked. The unlinking can be provided by a selective disconnect device, otherwise referred to as a lift line lock 66. In one construction, the winch 60 is a self-locking winch such that the lift line lock 66 is not a separate device, but rather integrated into the winch 60. The self-locking winch 60 can be normally locked so as to prevent unwinding of the winch line 62 (thus maintaining the linked status between the batten 24 and the counterweight arbor 40). Operation of a lever or button on the winch 60 can unlock the winch line 62 so that the lift lines 26 can move away from the counterweight arbor 40 as shown by FIG. 2 (in comparison to FIG. 1) to lower the batten 24 without raising the counterweight arbor 40. The winch 60 can be motorized or hand-operated. In some constructions, the lift line lock 66 can be provided on the counterweight arbor 40 separately from the winch 60. In such an example, the lift line lock 66 can engage one or both of the winch line 62 and the clew 44 so as to prevent unwinding of the winch line 62, and thus maintain the batten 24 and the counterweight arbor 40 in a linked status. When the lift line lock is locked in this way, the winch line 62 between the winch 60 and the lift line lock 66 need not be loaded (i.e., tensioned) for the normal operating configuration. It is also noted that the invention is not limited to a single device for linking/unlinking the batten 24 and the counterweight arbor 40. In other words, there may be multiple lift line locks, such as one integrated into the winch 60 and another separate from the winch 60 (e.g., directly between the counterweight arbor 40 and the clew 44).

Figure 3:
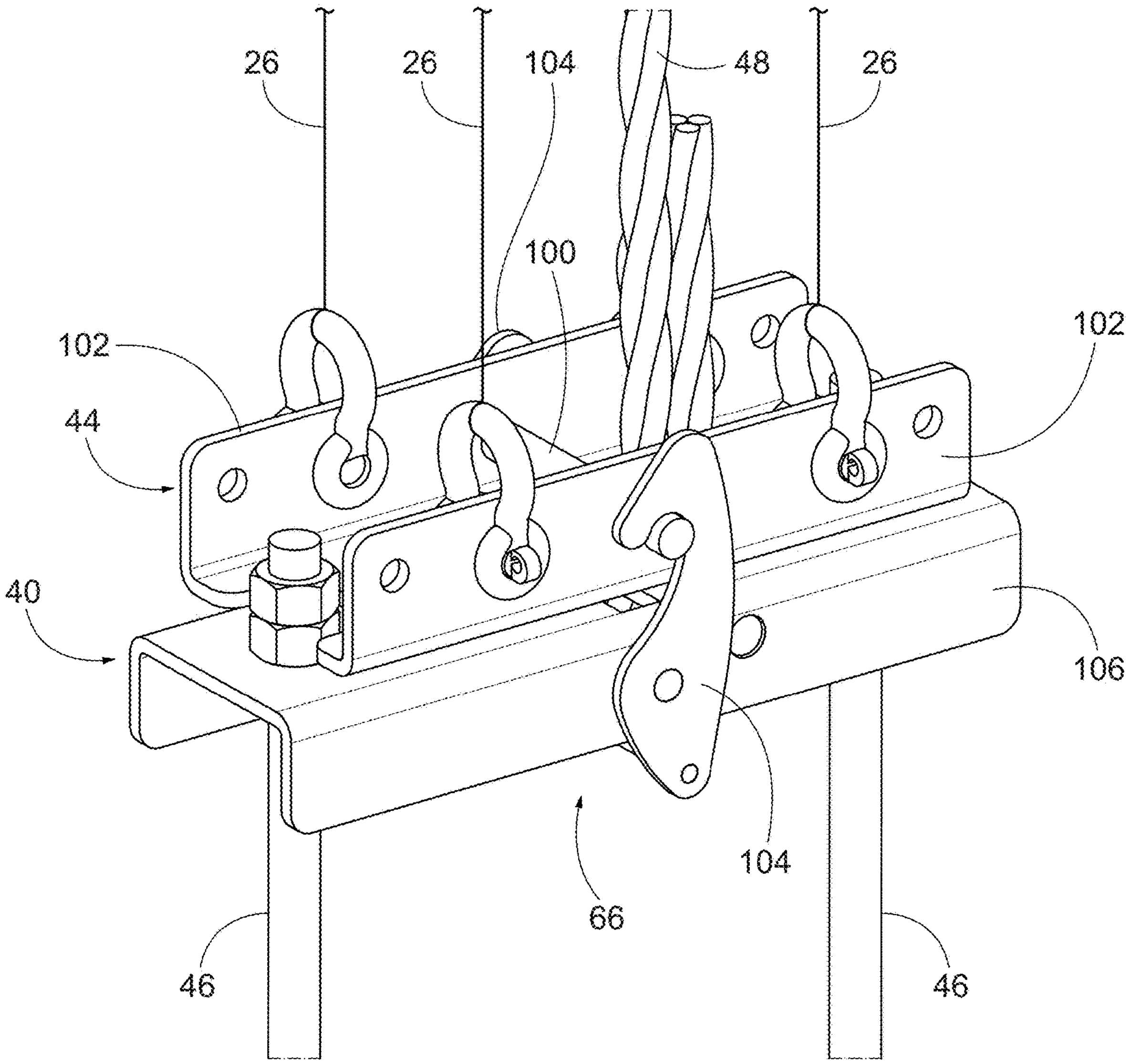
FIG. 3 is a perspective view of a locking/unlocking device at a top portion of the counterweight arbor.

FIG. 3 illustrates one exemplary physical construction for the lift line lock 66. In this construction, the clew 44 is provided with a pin 100 secured between two side plates 102 of the clew 44. The pin 100 can have one or more exposed portions configured for selective engagement by one or more latches 104 on the counterweight arbor 40 (e.g., extending upward from a top portion 106 or plate of the counterweight arbor 40). In the illustrated construction, the pin 100, which is extended horizontally, extends laterally from both of the clew side plates 102 for engagement with two latches 104. The latches 104 can be biased to the latched positions and configured to automatically latch the pin 100 when the clew 44 is brought into contact or close proximity to the top of the counterweight arbor 40. In other constructions, the latches 104 can be manually operated between latched and unlatched positions. Other constructions for latches or other types of locking/unlocking devices are also contemplated. As shown at the bottom of FIG. 3, the counterweight arbor 40 includes vertical rods 46 that cooperate to retain the ballast weights 42. For example, the vertical rods 46 can be dimensioned to fit into corresponding openings formed in the ballast weights 42. Thus, the ballast weights 42 are prevented from shifting, while still allowing easy stacking and removal. The vertical rods 46 extend from the top portion 106 of the arbor 40 shown in FIG. 3 to a bottom portion 110 (FIG. 5) that bears the weight of the assembled ballast weights 42.

Figure 4:
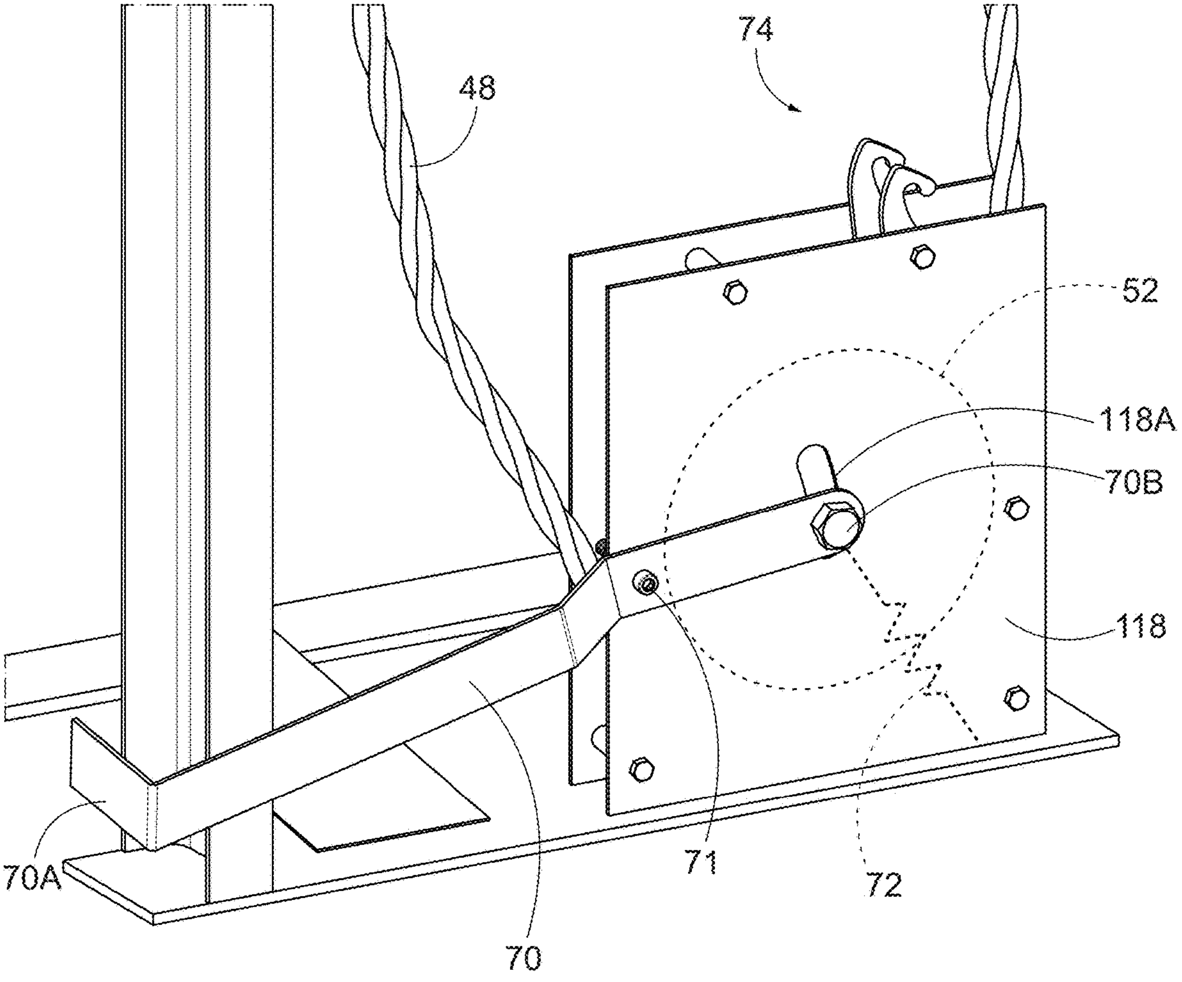
FIG. 4 is a perspective view of a tension release lever at a lower sheave of the counterweighted theatrical rigging system.

To further facilitate the use of the setup configuration, the rigging system 20 is provided with a tension release 70 for releasing the tension in the operating line 48. In the illustrated construction, the tension in the operating line 48 is released by raising the tensioned lower sheave 52. One exemplary construction of the tension release 70 includes an adjustable lever pivotally mounted at pivot 71 on a stationary fixture 118 for selectively raising the lower sheave 52, as shown for reference in FIG. 4. Releasing the tension at the lower sheave 52 (e.g., by stepping down on a foot pedal 70A of the adjustable lever, thus raising the lower sheave 52 with respect to the stage floor 28) acts to release tension in the operating line 48. With the tension partially or fully released, sliding movement is allowed between the head block 36 and the operating line 48, the benefit of which is described below in more detail. As shown in FIG. 4, the stationary fixture 118 can include parallel vertical plates, each formed with an arcuate slot 118A that guides movement of an axle 70B on the tension release 70. The axle 70B is located on an opposite side of the pivot 71 in relation to the foot pedal 70A. The lower sheave 52 is rotatably supported at the axle 70B such that the lower sheave 52 moves with the axle 70B in response to movement of the tension release 70—opposite the direction of the foot pedal 70A. Tension is restored to the operating line 48 by opposite (upward) movement of the tension release 70 (i.e., releasing the foot pedal 70A). The tension applied by the lower sheave 52 inhibits relative sliding between the operating line 48 and the head block 36. With the tension release 70 unactuated, tension is applied to the operating line 48 by the lower sheave 52 through the weight of the lower sheave 52, with or without an additional biasing member 72 (e.g., tension coil spring). Such a biasing member 72 can have one end secured to the axle 70B and another end secured to the stationary fixture 118.

Figure 5:
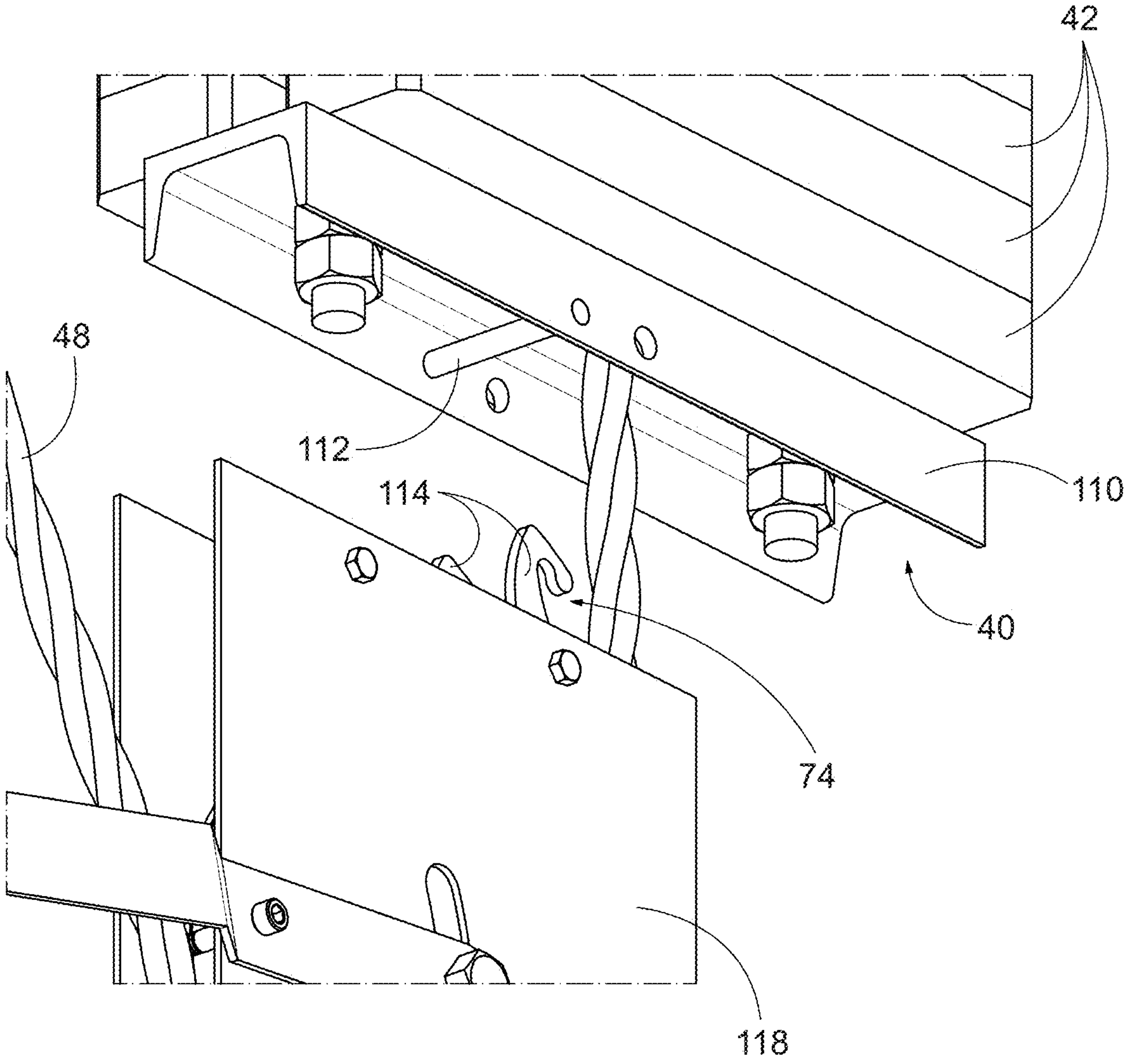
FIG. 5 is a perspective view of a counterweight arbor lock in an unlocked position adjacent a bottom portion of the counterweight arbor.

With further reference to FIGS. 4-5, a counterweight arbor lock 74 is provided and operable to selectively lock the counterweight arbor 40 against movement from its lowered position. The counterweight arbor lock 74 can be securely fixed to the stage floor 28, a nearby wall, or a stationary fixture extending from the floor or wall. When locked, a movable element of the counterweight arbor lock 74, such as a lock pin, or clamp, or latch, is engaged with the counterweight arbor 40 so that the counterweight arbor 40 is rendered immovable. Thus, the counterweight arbor 40 remains fixed during operation of the winch 60 to lower the unloaded batten 24 and subsequently raise the batten 24 following the loading thereof with the requisite equipment for a given theatrical performance. For operation of the rigging system 20 in the normal operating configuration, the counterweight arbor lock 74 is unused or in other words remains in the unlocking state.

One exemplary construction of the counterweight arbor lock 74 is shown in FIG. 5, wherein the bottom portion 110 of the counterweight arbor 40 is provided as a channel member that opens downward and supports a cross pin 112. The cross pin 112 is positioned for selective engagement by the counterweight arbor lock 74, which can be provided by one or more latches 114. The latches 114 can be pivotally supported on a stationary fixture 118 and may be operated manually by the operator or by other means (e.g., automatic or semi-automatic). In some constructions, including the illustrated construction, the stationary fixture 118 can be a fixture in or on which the tensioned lower sheave 52 is provided. In other constructions, the stationary fixture for the latches 114 can be separate from the tensioned lower sheave 52, e.g., on a rail in proximity to the counterweight arbor 40.

Operation of the rigging system 20 is described from a starting point in which the batten 24 is not yet loaded, and the counterweight arbor 40 is not loaded with ballast weight 42. The rigging system 20 is in the normal operating configuration. If the batten 24 is not already elevated, the rigging system 20 is operated by use of the operating line 48 to put the batten 24 to an elevated position, whereby the counterweight arbor 40 is put into a lowered position, which may be its lowermost position, as shown in FIG. 1. The counterweight arbor 40 is not necessarily in contact with the stage floor 28, and may be elevated a small amount (e.g., 3 feet or less) above the stage floor 28 that still enables access to the counterweight arbor 40 for loading ballast weight 42 by a person standing on the stage floor 28. At this time, the counterweight arbor 40 is in register with the counterweight arbor lock 74, and the counterweight arbor lock 74 is engaged (locked) to prevent upward movement of the counterweight arbor 40 relative to the stationary fixture 118. The tension release 70 at the lower sheave 52 is actuated to release tension on the operating line 48. The batten 24 and the counterweight arbor 40 are unlinked to allow independent movement of the batten 24. The unlinking is in some constructions accomplished by manipulation of the lift line lock 66 to an unlocked state by which the lift lines 26 and the clew 44 are rendered movable up away from the counterweight arbor 40. The weight of the batten 24 then loads not only the lift lines 26 but also the winch line 62 between the batten 24 and the winch 60. Thus, the rigging system 20 is fully converted from the normal operating configuration into the setup configuration.

Once in the setup configuration, the rigging system 20 is placed into the loading configuration of FIG. 2. The loading configuration can be regarded as a subordinate and specific configuration within the setup configuration. The loading configuration of FIG. 2 is obtained by operating the winch 60 to release or unwind the winch line 62. As such, the batten 24 is lowered by its own weight in a controlled manner, without any upward movement of the counterweight arbor 40, which remains in the lowered and locked position. Although released for movement away from the counterweight arbor 40, the clew 44 and the lift lines 26 remain connected to the counterweight arbor 40 by the winch line 62. The batten 24 is lowered to the stage floor 28 for loading with the necessary theatrical equipment by one or more technicians on the stage floor 28. Once fully loaded, the ballast weight 42 is added to the counterweight arbor 40 to balance the weight of the loaded batten 24. This takes place from the stage floor 28. In other words, the technician(s) doing the loading of the counterweight arbor 40 can stand directly on the stage floor 28, as opposed to climbing up into an elevated gallery. This also means that the ballast weight 42 for the counterweight arbor 40 can be loaded from a storage location at the stage floor level, as opposed to an overhead storage location.

After the theatrical equipment is loaded onto the batten 24 and the desired weights are added to the counterweight arbor 40, the winch 60 is then operated to wind up the winch line 62 and bring the batten 24 up while bringing the clew 44 and the lift lines 26 back down toward the counterweight arbor 40. When the batten 24 is fully raised, the rigging system 20 is converted back into the normal operating configuration. This is accomplished in part by unlocking the counterweight arbor lock 74 to release the counterweight arbor 40 from the stationary fixture 118 for vertical movements in response to the operating line 48. The lift lines 26 are also positively locked to the counterweight arbor 40. This may be accomplished by locking the winch 60 and/or operating the lift line lock 66 to the locked position. This re-establishes the linked status of the batten 24 and the counterweight arbor 40 for counter movements in response to the operating line 48 for regular use of the rigging system 20.

The illustrated construction illustrates a single-purchase system in which the batten 24 and the counterweight arbor 40 move in 1:1 relation during normal operation, and the ballasted counterweight arbor 40 will approximately match the weight of the loaded batten 24. However, aspects of the invention can also be applied to constructions other than that shown, including for example double-purchase systems in which the batten 24 moves in 2:1 relation to the counterweight arbor 40 and the counterweight arbor 40 is ballasted to approximately twice the weight of the loaded batten 24.

Figure 6:
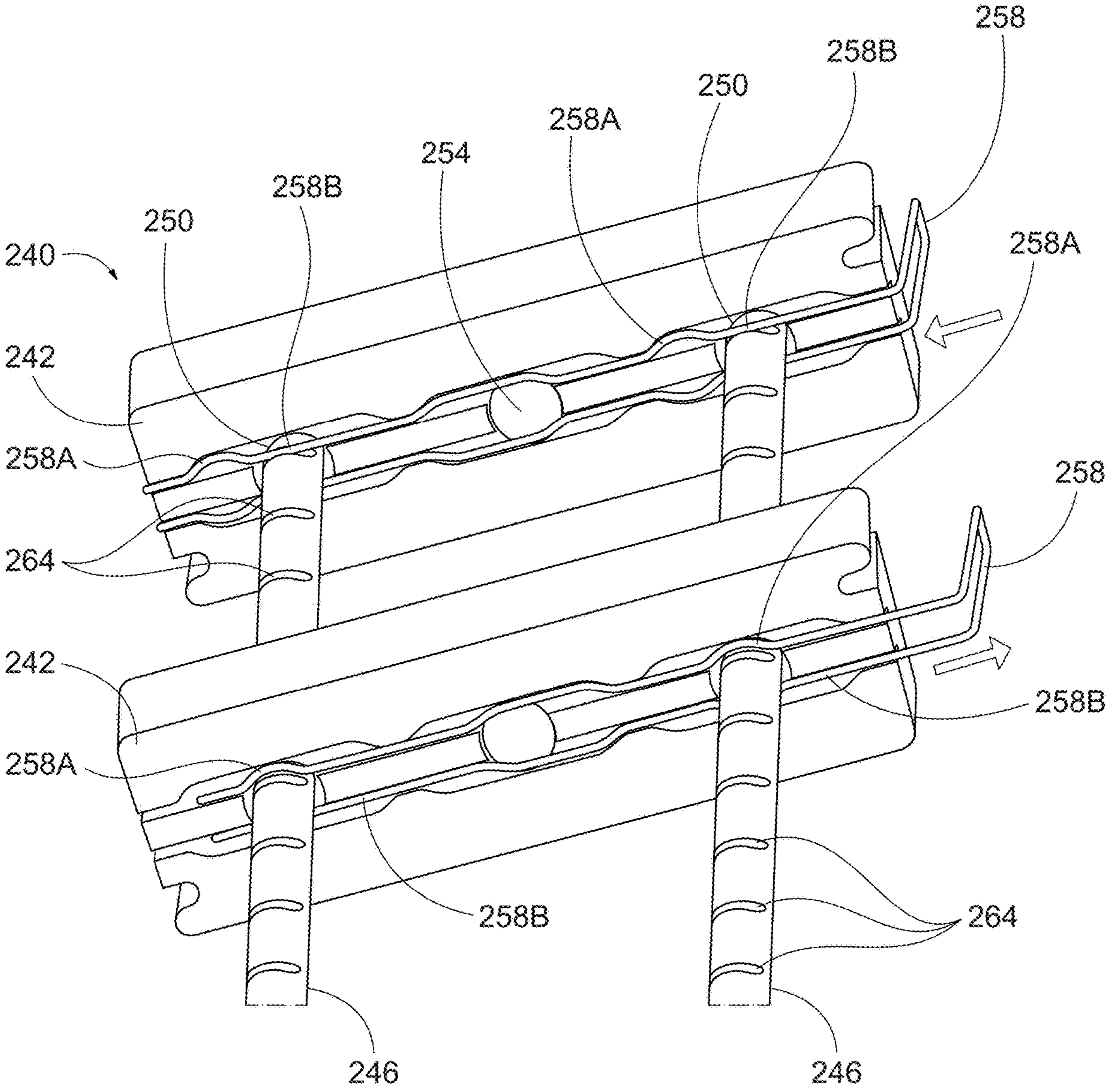
FIG. 6 is an underside perspective view of a counterweight arbor having an alternate configuration for the securement of ballast weights.
Figure 7:
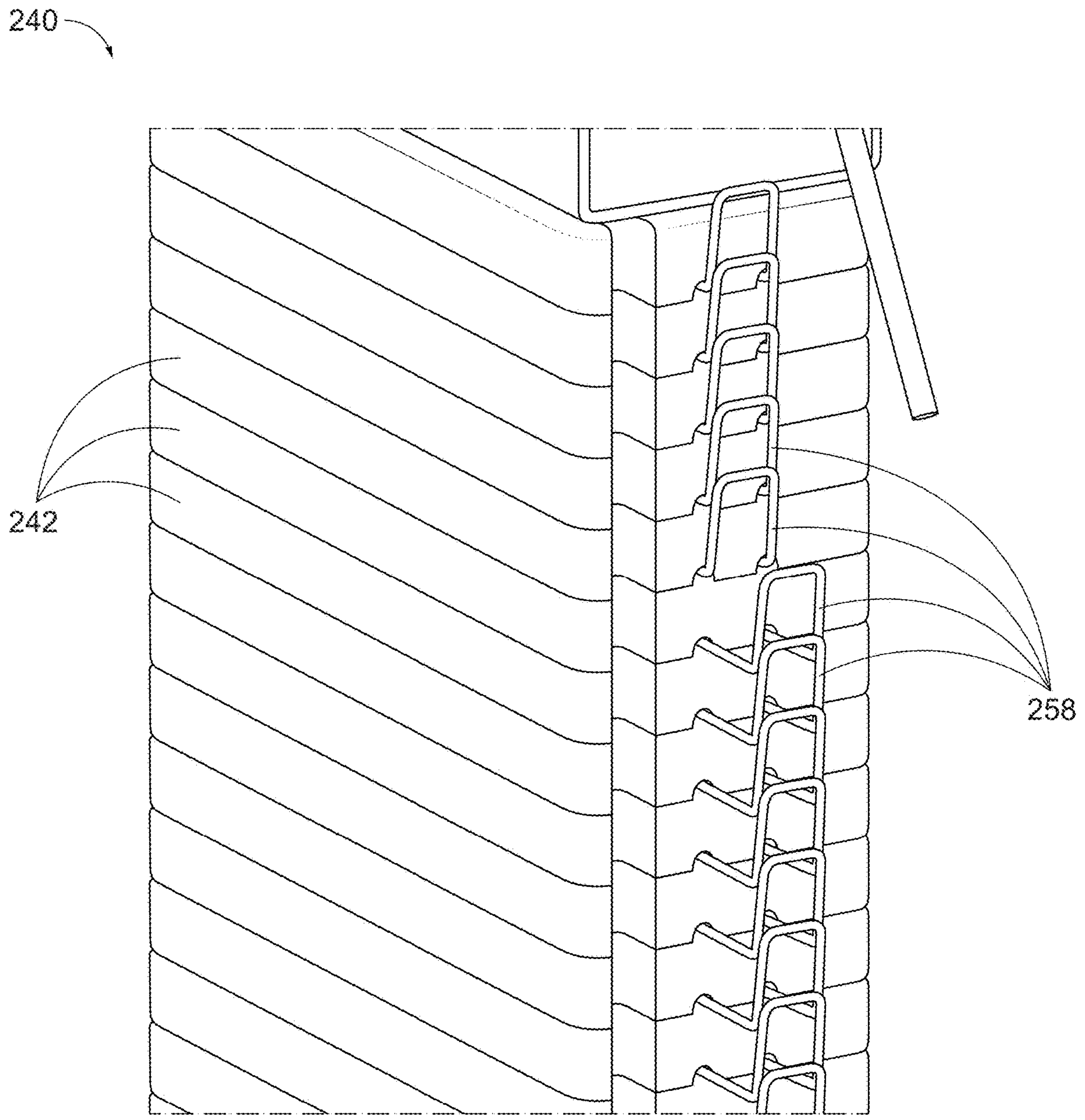
FIG. 7 illustrates the counterweight arbor of FIG. 6, having locking pins engaged for only the top five ballast weights, such that the remaining ballast weights below are rendered inactive.

FIGS. 6 and 7 illustrate a counterweight arbor 240 having an alternate configuration for the securement of ballast weights 242. Similar to the counterweight arbor 40 of the preceding figures and description, the counterweight arbor 240 includes at least one (e.g., a pair of) vertical rod 246 configured to retain the ballast weights 242. For example, the vertical rods 246 fit into corresponding openings 250 formed in the ballast weights 242. The ballast weights 242 also have a central opening 254 for passage of the operating line 48. However, the counterweight arbor 240 of FIGS. 6 and 7 is configured to provide selective engagement of the ballast weights 242 (individually or as a group) to the rods 246. For this purpose, there is a locking pin 258 provided for each one of the ballast weights 242, and the ballast weights 242 can be locked (or activated) or unlocked (or inactive). As such, ballast weights 242 can all remain in a "loaded" or "ready" position—rather than needing be removed entirely from the counterweight arbor 240 when not needed. When less than all of the ballast weights 242 are needed for a working configuration of the batten 24, the required number of ballast weights 242 at the top of the stack of weights have their locking pins 258 locked or inserted in order to activate those particular ballast weights 242, while the remaining ballast weights 242 at the bottom of the stack are left inactive by the locking pins 258 being unlocked or retracted. The locking pins 258 can be slidably engaged with a track formed in the corresponding ballast weight 242 (e.g., along its bottom surface).

As shown in FIG. 6, each locking pin 258 has a portion that extends under the corresponding ballast weight 242 and another portion, or exposed portion, that extends out laterally beyond the ballast weight 242 to form a handle or grip for manipulating the locking pin 258. The locking pin 258 can be formed in two elongated sections or arms such that the vertical rods 246 are received between the two arms of the locking pin 258. The locking pin arms have first sections 258A spaced at a first distance and second sections 258B spaced at a second distance smaller than the first distance. At the bottom of FIG. 6, the locking pin 258 is in the retracted position to place the first sections 258A in register with the rods 246—thus, deactivating the bottom ballast weight 242 in FIG. 6. The spacing distance of the first sections 258A is greater than a corresponding outer profile dimension of the rods 246, allowing free passage of the rods 246 such that the counterweight arbor 240 and any active ballast weights 242 (above) move up and down without movement of the deactivated ballast weight 242 (below). The ballast weight 242 at the top of FIG. 6 is shown activated by insertion of the locking pin 258 to place the second sections 258B in register with the rods 246 for interlocking therewith. In this position, the arms of the locking pin 258 mate with corresponding notches 264 where the outer profile dimension of the rods 246 is locally reduced. Accordingly, each of the ballast weights 242 is individually activated or deactivated by the corresponding locking pin 258, rather than one pin that must be moved around and singularly bear the entire responsibility for the entire ballast weight stack. However, as can be seen in FIG. 7, the exposed portions of the locking pins 258 are configured to overlap vertically with each other such that locking of a given locking pin 258 contacts the locking pin 258 above to force it into the locked position, and so on with each subsequent locking pin 258 above. The unlocking of a given locking pin 258 contacts the locking pin 258 below to force it into the unlocked position, and so on with each subsequent locking pin 258 below. This arrangement guarantees that the ballast weights 242 are always activated from the top of the stack downward, since the activated ballast weights 242 are the only ones that move upward with the counterweight arbor 240 to lower the batten 24. Although illustrated with a pair of rods 246, the counterweight arbor 240 can have a single rod or more than two rods in other constructions. Furthermore, the rod(s) 246 may be constructed in various sizes or shapes.

Various features of the disclosure are set forth in the following claims.

What is claimed is:

1. A counterweighted theatrical rigging system for movably supporting theatrical equipment above a stage floor, the rigging system comprising:

a batten on which the theatrical equipment is configured to be supported; and a counterweight arbor configured to balance and offset the weight of the loaded batten, wherein the counterweighted theatrical rigging system is convertible by a selective disconnect device between a first configuration in which the batten and the counterweight arbor are linked for corresponding movement in opposite vertical directions, and a second configuration that allows the batten to be lowered to the stage floor while the counterweight arbor remains in a lowered position for ballasting the counterweight arbor from the stage floor.

2. The counterweighted theatrical rigging system of claim 1, wherein a winch is supported on the counterweight arbor and operable in the second configuration to unwind a winch line between the counterweight arbor and the batten for lowering the batten to the stage floor while the counterweight arbor remains in the lowered position.

3. The counterweighted theatrical rigging system of claim 2, wherein the winch line is coupled to a clew from which a plurality of lift lines extend to the batten, the rigging system further comprising a head block and a plurality of loft blocks over which the plurality of lift lines extend.

4. The counterweighted theatrical rigging system of claim 3, further comprising a lift line lock selectively engageable and disengageable between the clew and the counterweight arbor to achieve the first configuration and the second configuration, respectively.

5. The counterweighted theatrical rigging system of claim 2, further comprising a lift line lock integrated within the winch and switchable to convert the counterweighted theatrical rigging system between the first configuration and the second configuration.

6. The counterweighted theatrical rigging system of claim 1, further comprising a counterweight arbor lock operable to selectively lock the counterweight arbor in the lowered position.

7. The counterweighted theatrical rigging system of claim 1, wherein the counterweight arbor includes a rod configured to selectively retain one or more of a plurality of individual ballast weights.

8. The counterweighted theatrical rigging system of claim 7, wherein, with the rod extending through the plurality of individual ballast weights arranged in a single stack, a select group of the plurality of ballast weights at the top of the stack are secured to the rod by individual locking pins.

9. A counterweighted theatrical rigging system comprising:

a head block and a plurality of loft blocks provided at an elevated height above a stage floor;

a plurality of lift lines extending over the head block and the plurality of loft blocks;

a batten configured to be loaded with theatrical equipment, the batten coupled with first ends of the plurality of lift lines;

a counterweight arbor configured to balance and offset the weight of the loaded batten, wherein the counterweight arbor is coupled with second ends of the plurality of lift lines;

a lift line lock configured to selectively lock the second ends of the plurality of lift lines to the counterweight arbor; and a winch configured to selectively reel in or let out the second ends of the plurality of lift lines from the counterweight arbor when the lift line lock is not locked.

10. The counterweighted theatrical rigging system of claim 9, wherein the lift line lock is integrated within the winch.

11. The counterweighted theatrical rigging system of claim 9, wherein the lift line lock is separate from the winch.

12. The counterweighted theatrical rigging system of claim 11, wherein a winch line extending from the winch is coupled to a clew from which the plurality of lift lines extend to the batten.

13. The counterweighted theatrical rigging system of claim 9, wherein the counterweight arbor includes a rod configured to selectively retain one or more of a plurality of individual ballast weights.

14. The counterweighted theatrical rigging system of claim 13, wherein, with the rod extending through the plurality of individual ballast weights arranged in a single stack, a select group of the plurality of ballast weights at the top of the stack are secured to the rod by individual locking pins.

15. A method of operating a counterweighted theatrical rigging system, the method comprising:

loading theatrical equipment to a batten from the stage floor with the batten in a lowered position;

from the stage floor, ballasting a counterweight arbor that is coupled to the batten while the batten is in the lowered position; and after loading the batten and ballasting the counterweight arbor, converting the rigging system from a loading configuration in which the batten can move vertically without movement of the counterweight arbor into an operating configuration in which the batten and the counterweight arbor are linked for corresponding movement in opposite vertical directions.

16. The method of claim 15, wherein converting the rigging system includes moving a plurality of lift lines that extend from the batten over a plurality of loft blocks and a head block down toward the counterweight arbor and locking the lift lines to the counterweight arbor.

17. The method of claim 16, wherein moving the plurality of lift lines includes operating a winch supported on the counterweight arbor to wind up a winch line that extends from the winch to the plurality of lift lines.

18. The method of claim 17, wherein converting the rigging system further includes operating a lift line lock integrated within the winch.

19. The method of claim 17, wherein converting the rigging system further includes operating a lift line lock separate from the winch.

20. The method of claim 15, wherein ballasting the counterweight arbor includes engaging a stack of individual ballast weights retained by a rod of the counterweight arbor.

21. The method of claim 20, wherein ballasting the counterweight arbor includes activating a respective locking pin for each of a select group of the stack of individual ballast weights at a top end of the stack, and leaving one or more additional ballast weights of the stack of individual ballast weights disengaged from the counterweight arbor rod.

* * * * *